(12) United States Patent
Manabe et al.

(10) Patent No.: US 10,335,820 B2
(45) Date of Patent: Jul. 2, 2019

(54) PAINTING METHOD AND PAINTING FACILITY

(71) Applicant: Taikisha Ltd., Tokyo (JP)

(72) Inventors: Keiji Manabe, Tokyo (JP); Takaaki Tagomori, Tokyo (JP)

(73) Assignee: Taikisha Ltd., Tokyo (JP)

( * ) Notice: Subject to any disclaimer, the term of this patent is extended or adjusted under 35 U.S.C. 154(b) by 124 days.

(21) Appl. No.: 15/312,327

(22) PCT Filed: Apr. 9, 2015

(86) PCT No.: PCT/JP2015/061122
§ 371 (c)(1),
(2) Date: Nov. 18, 2016

(87) PCT Pub. No.: WO2015/178121
PCT Pub. Date: Nov. 26, 2015

(65) Prior Publication Data
US 2017/0095825 A1    Apr. 6, 2017

(30) Foreign Application Priority Data

May 23, 2014    (JP) ................................. 2014-107075

(51) Int. Cl.
*B05B 13/04*    (2006.01)
*B05B 16/00*    (2018.01)
(Continued)

(52) U.S. Cl.
CPC ........ *B05B 13/0431* (2013.01); *B05B 12/006* (2013.01); *B05B 13/0221* (2013.01);
(Continued)

(58) Field of Classification Search
None
See application file for complete search history.

(56) References Cited

U.S. PATENT DOCUMENTS 5,165,969 A * 11/1992 Barlett .................. F26B 23/022
427/483
2013/0171360 A1 * 7/2013 Herre .................. B05B 13/0221
427/427.3

FOREIGN PATENT DOCUMENTS

DE    102010032144 A1    1/2012
EP          1745858 A2    1/2007
(Continued)

*Primary Examiner* — Nathan T Leong
(74) *Attorney, Agent, or Firm* — The Webb Law Firm

(57) ABSTRACT

After completion of a preceding painting in a preceding painting area, by an action of a preceding painting robot, a painting object (object to be painted) is caused to be held together with a holder by a transfer section near two painting areas. In succession, with maintaining connection between the painting object and the holder, connection between an arm leading end portion of the preceding painting robot and the holder is released. Thereafter, by an action of a subsequent painting robot, an arm leading end portion of the subsequent painting robot with keeping its connection to the painting object is connected to the holder held to the transfer section. With this, in the course of transfer of the painting object between the painting robots for displacing the painting object relative to a spraying means, a relative positional relation between the arm leading portions of the painting robots and the painting object can be maintained same.

15 Claims, 9 Drawing Sheets

(51) Int. Cl.
*B05D 1/02* (2006.01)
*B05B 16/20* (2018.01)
*B05B 12/00* (2018.01)
*B05B 13/02* (2006.01)
*B25J 11/00* (2006.01)
*B25J 9/00* (2006.01)
*B25J 15/00* (2006.01)
*B25J 15/04* (2006.01)
*B25J 15/06* (2006.01)
*B05B 14/41* (2018.01)
*B05B 15/72* (2018.01)
*B05B 12/12* (2006.01)
*B05B 14/43* (2018.01)

(52) U.S. Cl.
CPC ............ *B05B 14/412* (2018.02); *B05B 15/72* (2018.02); *B05B 16/00* (2018.02); *B05B 16/20* (2018.02); *B05D 1/02* (2013.01); *B25J 9/0084* (2013.01); *B25J 11/0075* (2013.01); *B25J 15/0052* (2013.01); *B25J 15/0441* (2013.01); *B25J 15/0616* (2013.01); *B05B 12/122* (2013.01); *B05B 14/43* (2018.02)

(56) References Cited

FOREIGN PATENT DOCUMENTS

| | | |
|---|---|---|
| JP | 2117059 U | 9/1990 |
| JP | 6134360 A | 5/1994 |
| JP | 2005103446 | 4/2005 |
| JP | 2011115761 A | 6/2011 |

\* cited by examiner

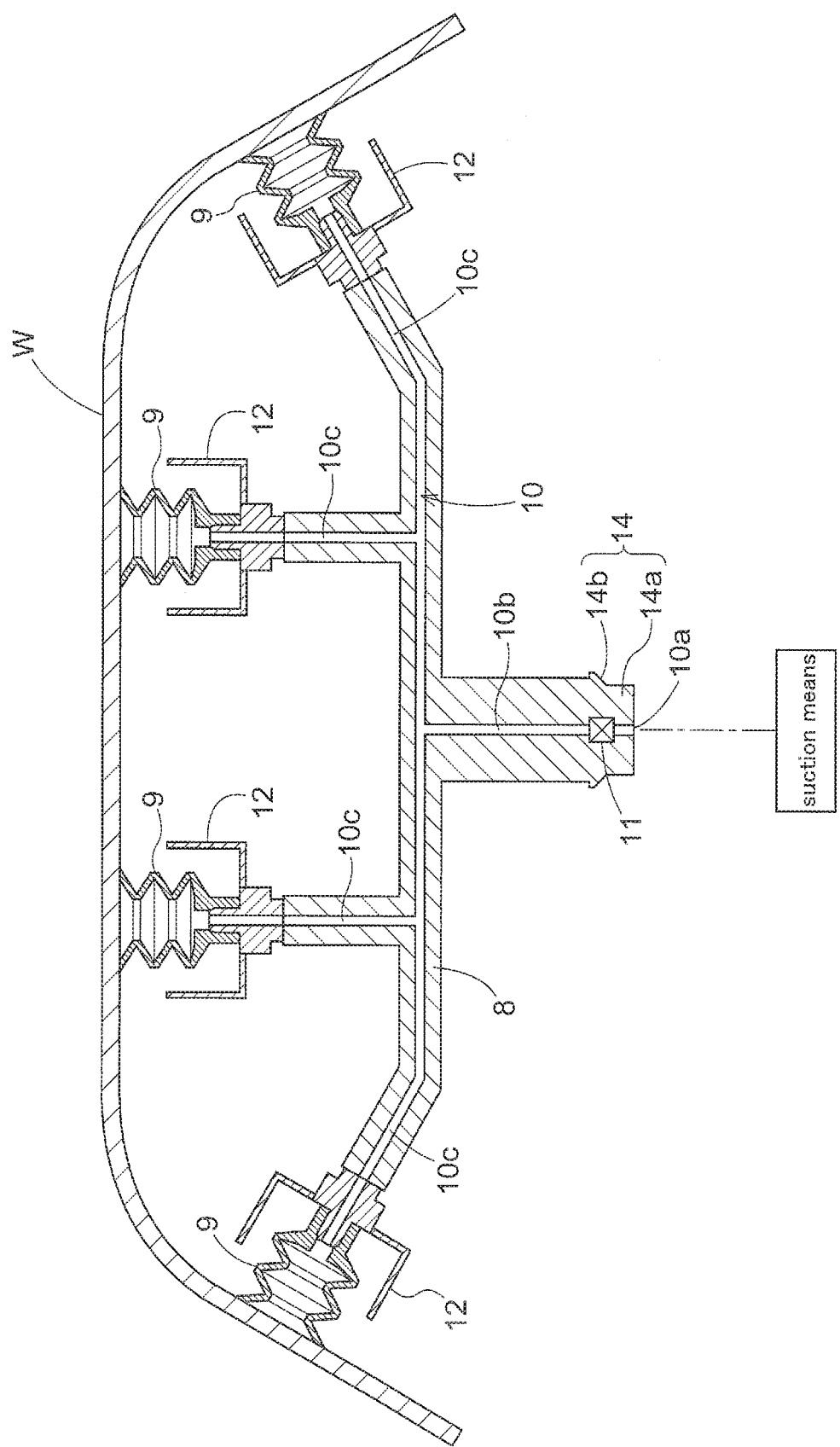

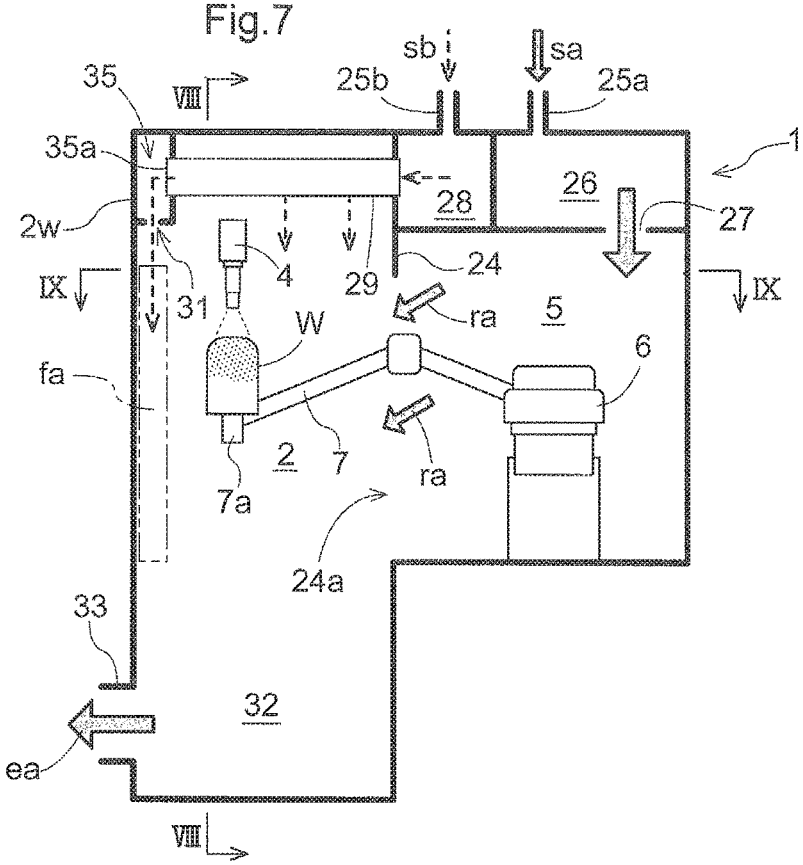
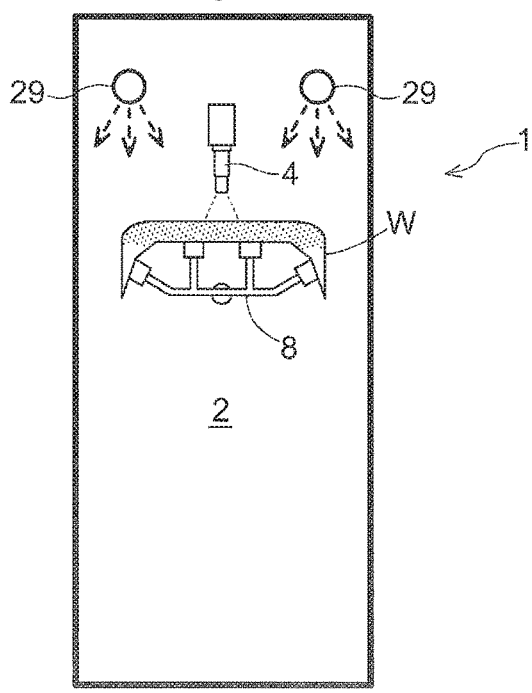

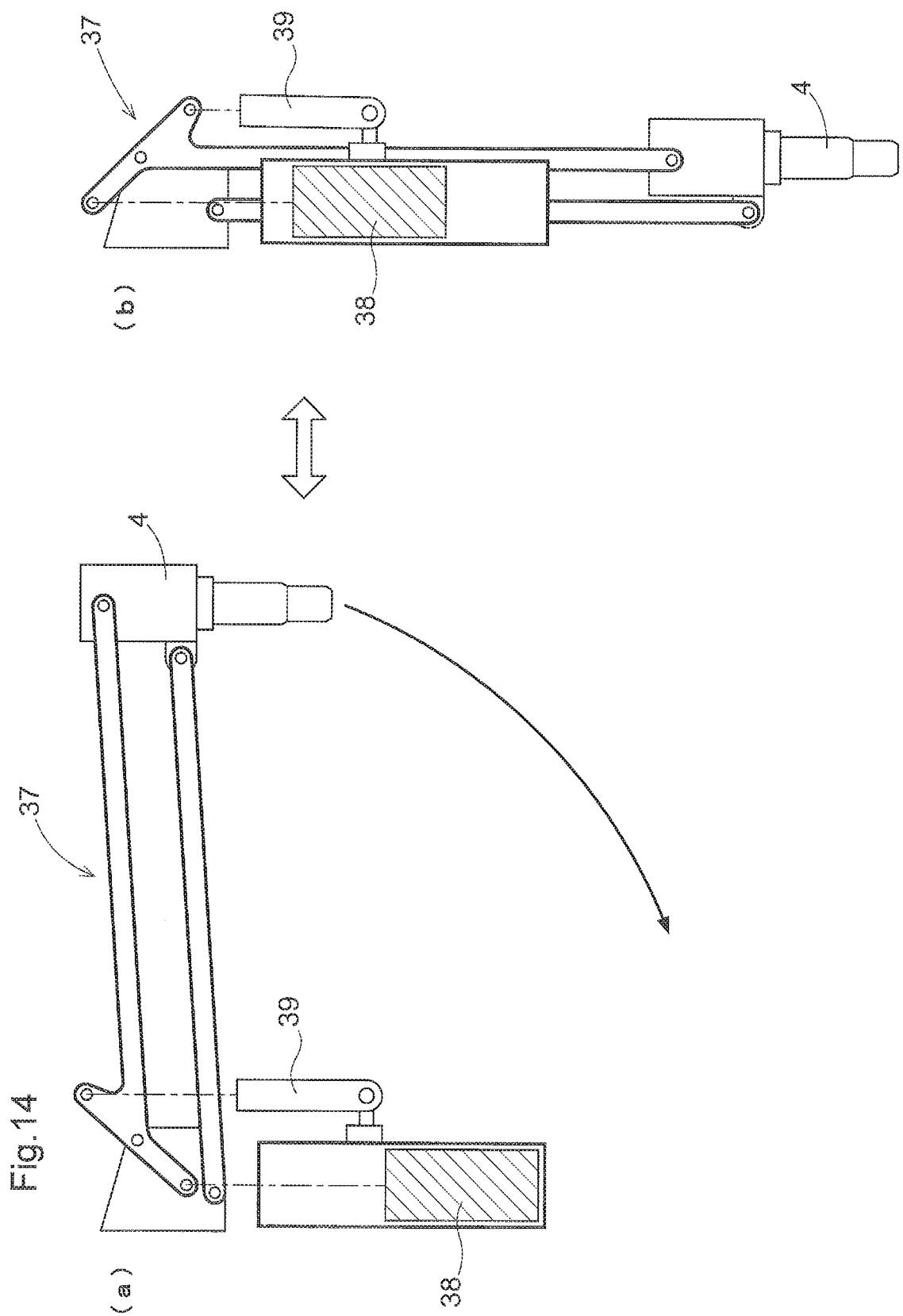

PAINTING METHOD AND PAINTING FACILITY

CROSS-REFERENCE TO RELATED APPLICATIONS

This application is the United States national phase of International Application No. PCT/JP2015/061122 filed Apr. 9, 2015, and claims priority to Japanese Patent Application No. 2014-107075 filed May 23, 2014, the disclosures of which are hereby incorporated in their entirety by reference.

TECHNICAL FIELD

This invention relates to a painting method and a painting facility for implementing the painting method.

In this painting method and painting facility, an object to be painted (hereinafter "painting object") is connected via a holder to an arm leading end portion of a painting robot. Then, while the painting object is being displaced relative to a spraying means by an action of the painting robot, the painting object is painted by paint spraying from the spraying means.

BACKGROUND ART

Conventionally, regarding a painting method and a painting facility of the above-noted type, Patent Document 1 identified below discloses the following technical matters (see in particular, its FIGS. 14-17).

A plurality of painting areas ("painting zones") are disposed side by side in a row. In each one of these painting areas, there are installed a downwardly oriented spraying means and a painting robot for changing a position and a posture of the painting object (a bumper of an automobile in this case) relative to paint spraying from the spraying means.

And, this Patent Document 1 discloses following technical matters also.

(A) In a shooter for feeding a painting object to a first painting area, a worker attaches a holder (a jig) for fixing the painting robot and the painting object to each other to the painting object. Then, the painting robot receives the painting object from the shooter (paragraphs 0073-0074).

(B) The painting robot can receive and transfer the painting object between the inside and the outside of a painting booth. Namely, the painting robot acts also as a conveying means for the painting object. With this, it becomes possible to omit a conveyer device which extends through the painting booth and conveys the painting object (paragraph 0079).

(C) When a primer, a base paint and a transparent paint are sprayed inside a same painting booth, if drying is needed prior to spraying of the next paint, there will be reserved, inside the painting booth, a space which allows temporary storage of the painting object. It is also possible to spray-paint a plurality of painting objects alternately (that is, they will be dried alternately in the temporary storage space) (paragraph 0081).

(D) As a plurality of painting zones, a primer zone, a base coat zone and a clear coat zone are provided. And, receipt and transfer of painting object is made possible by the painting robot between adjacent zones (paragraph 0088).

PRIOR ART DOCUMENT

Patent Document 1: Japanese Unexamined Patent Application Publication No. 2005-103446

SUMMARY

Problem to be Solved by Invention

However, with the painting method and painting facility disclosed in this Patent Document 1, although it is understood that the painting object is received and transferred between adjacent painting areas (zones) by the painting robot, the document is totally silent about specific manner of receipt and transfer.

Further, although it is understood that the painting object is fixed to the painting robot via the holder (jig), the document is silent even about the specific manner of handling of such holder.

For this reason, the painting method and painting facility disclosed in Patent Document 1 suffer the problem of inability yet of realizing a painting operation in the manner of receiving/transferring a painting object between painting areas with using a painting robot configured to displace the painting object relative to the spraying means.

In view of the above-described state of the art, a principal object of the present invention is to overcome the above problem by adopting a reasonable manner of receipt and transfer, regarding the receipt and transfer of the painting object between painting areas.

Solution to the Problem

A first characterizing feature of the present invention relates to a painting method, and according to the feature, a painting method in which a painting object is connected via a holder to an arm leading end portion of a painting robot and the painting object is painted by paint spraying from a spraying means while displacing the painting object relative to the spraying means by an action of the painting robot;

wherein in a preceding painting area, a preceding painting is effected on the painting object by paint spraying from a preceding spraying means while displacing the painting object relative to the preceding spraying means by an action of a preceding painting robot, with keeping the painting object connected via the holder to an arm leading end portion of the preceding painting robot;

wherein in a subsequent painting area subsequently to the preceding painting in the preceding painting area, a subsequent painting is effected on the painting object by paint spraying from a subsequent spraying means while displacing the painting object relative to the subsequent spraying means by an action of a subsequent painting robot, with keeping the painting object connected via the holder to an arm leading end portion of the subsequent painting robot;

wherein after completion of the preceding painting in the preceding painting area, the painting object is caused to be held to a transfer section located near the two painting areas, by an action of the preceding painting robot, and connection between the arm leading end portion of the preceding painting robot and the holder is released with keeping connection between the painting object and the holder; and wherein while the arm leading end portion of the preceding painting robot is retracted from the transfer section, by an action of the subsequent painting robot, the arm leading end portion of the subsequent painting robot, with keeping the connection thereof to the painting object, is connected to the holder which is being held to the transfer section, thereby to shift to the subsequent painting in the subsequent painting area in succession.

EFFECT OF INVENTION 1

According to the painting method having the above-described configuration, in the preceding painting and the subsequent painting subsequent thereto, respectively, the painting object is painted by paint spraying from the spraying means while displacing the painting object relative to the spraying means by an action of the painting robot.

Therefore, in comparison with converse configuration in which the painting object is painted with displacement of the spraying means alone while the spraying object remains substantially fixed, enlargement of paint scattering area due to displacement of the spraying means can be effectively avoided.

With the above, paint coating effect of the sprayed paint to the painting object can be enhanced. Further, adherence of excess sprayed paint to e.g. chamber wall of the painting area can be effectively reduced also.

And, after completion of the preceding painting, when the painting object is to be transferred to the subsequent painting robot for subsequent painting, by an action of the preceding painting robot, the painting object, together with the holder, is caused to be transferred to the transfer section adjacent the two painting areas.

While the connection between the painting object and the holder is maintained, the connection between the arm leading end portion of the preceding painting robot and the holder is released. Further, thereafter, the arm leading end portion of the preceding painting robot is retracted away from the transfer section. Under this condition, by an action of the subsequent painting robot, the arm leading end portion of the subsequent painting robot, with its connection to the painting object maintained, is connected to the holder held to the transfer section.

Therefore, in each of the preceding painting and the subsequent painting, the relative positional relation between the arm leading end portion of the painting robot and the painting object can be made same.

Namely, in case the painting object is received and transferred directly in a hand-transfer manner between the preceding painting robot and the subsequent painting robot, in order to avoid interference between the respective arm leading end portions of the preceding painting robot and the subsequent painting robot, it is necessary to vary the relative positional relation between the arm leading end portion of the subsequent painting robot and the painting object, relative to the arm leading end portion of the preceding painting robot and the painting object.

On the other hand, according to the above-described arrangement, such relative positional relation can be kept same in the preceding painting and the subsequent painting.

Further, in the reception/transfer of the painting object between the preceding painting robot and the subsequent painting robot, in case the painting object alone is held to the transfer section with keeping the holder connected to the preceding painting robot, there tends to occur a change in the connection posture of the painting object relative to the arm leading end portion of the painting robot between the preceding painting and the subsequent painting.

On the other hand, according to the above-described arrangement wherein the object is held to the transfer section with keeping the connection between the painting object and the holder, such change in the painting object connection posture can also be effectively prevented.

Namely, the relative positional relation of the painting object relative to the arm leading end portion of the painting robot and the connection posture of the painting object relative to the arm leading end portion of the painting robot can be maintained same in the preceding painting and the subsequent painting.

Therefore, the respective motions of the preceding painting robot and the subsequent painting robot can be simple. Further, while the configuration of the holder is made simple, the painting object can be painted with high accuracy in the preceding painting and the subsequent painting respectively.

Incidentally, the present invention is applicable also to a case of disposing three or more painting areas side by side, in a mode such that a painting area which becomes a subsequent painting area relative to a foregoing painting area constitutes a "preceding painting area" relative to a next painting area.

A second characterizing feature of the present invention relates to a painting facility for implementing the painting method according to the first characterizing feature, and according to this feature, the painting facility comprises:

a controlling means for causing the preceding painting robot and the subsequent painting robot respectively to act automatically in accordance with a preset operational program;

wherein the controlling means is configured to automatically execute release of connection between the arm leading end portion of the preceding painting robot and the holder after completion of the preceding painting and execute subsequent connection between the arm leading end portion of the subsequent painting robot and the holder.

EFFECT OF INVENTION 2

In the painting facility having the above-described configuration, by implementing the painting method according to the first characterizing feature, as described above, the relative positional relation of the painting object relative to the arm leading end portion of the painting robot and the connection posture of the painting object relative to the arm leading end portion of the painting robot can be maintained same in the preceding painting and the subsequent painting.

Therefore, the respective motions of the preceding painting robot and the subsequent painting robot can be simple. Further, while the configuration of the holder is made simple, the painting object can be painted with high accuracy in the preceding painting and the subsequent painting respectively.

Further, with the painting facility described above, the controlling means automatically executes release of connection between the arm leading end portion of the preceding painting robot and the holder after completion of the preceding painting and executes subsequent connection between the arm leading end portion of the subsequent painting robot and the holder.

With the above, in comparison with an arrangement wherein similar reception/transfer operation is effected by a manual operation on the preceding painting robot and the subsequent painting robot, the reception/transfer of the painting object between the preceding painting robot and the subsequent painting robot can be effected in an even more smooth and reliable manner.

Therefore, the painting operation in and between the preceding painting area and the subsequent painting area can be carried out in an efficient manner.

A third characterizing feature of the present invention relates to the painting facility having the second characterizing feature, according to the feature, in the execution of the automatic action of the preceding painting robot and the subsequent painting robot in accordance with the preset operational program, the controlling means displaces the painting object relative to the preceding spraying means and the subsequent painting means, with varying the posture of the painting object in such a manner to maintain a painting progress face at each timing of the painting object perpendicular to a paint spraying direction from the preceding spraying means and the subsequent painting means.

EFFECT OF INVENTION 3

With the painting facility having the above configuration, a painting progress face of the painting object at each timing (the face receiving paint spraying) is maintained perpendicular to the paint spraying direction from the preceding spraying means and the subsequent spraying means.

Therefore, the coating efficiency of paint spraying to the painting object can be maintained even higher. Also, the coating quality of the painting object can be further improved also. Moreover, adherence of excess sprayed paint to e.g. a chamber wall of a painting area can be reduced even more effectively.

A fourth characterizing feature of the present invention relates to the painting facility having the second characterizing feature, according to this feature:

as an arm-holder connecting means for connecting the respective arm leading end portion of the preceding painting robot and the subsequent painting robot to the holder, one of the respective arm leading portion of the preceding painting robot and the subsequent painting robot and the holder defines a connection hole and the other forms a connection projection to be fitted into the connection hole;

in the connection hole, there is formed a tapered entrance portion having a tapered inner circumferential face whose diameter progressively increases toward a hole entrance, the tapered entrance portion guiding the connection projection to a center of the connection hole by causing the tapered inner circumferential face into sliding contact with the connection projection in association with fitting of the connection projection into the connection hole.

EFFECT OF INVENTION 4

With the painting facility having the above configuration, when the connection projection is fitted into the connection hole, with guidance of the tapered inner circumferential face of the tapered entrance portion of the connection hole, the connection projection can be positioned at the center of the connection hole in a reliable and smooth manner.

Therefore, the connection between the respective arm leading end portion of the preceding painting robot and the subsequent painting robot and the holder can be effected appropriately and easily.

Also, the relative positional relation at the time of connection between the respective arm leading end portion of the preceding painting robot and the subsequent painting robot and the holder can be maintained to a same positional relation in a reliable manner.

Therefore, in the preceding painting and the subsequent painting respectively, the painting object can be painted with even higher accuracy.

A fifth characterizing feature of the present invention relates to the painting facility having the fourth characterizing feature, according to the characterizing feature:

in the connection projection, there is formed a tapered stepped portion which fits into the tapered entrance portion when a tapered outer circumferential face thereof comes into face contact with the tapered inner circumferential face of the tapered entrance portion, with fitting of the connection projection into the connection hole.

EFFECT OF INVENTION 5

With the painting facility having the above configuration, in the fitting engagement of the connection projection into the connection hole, the tapered outer circumferential face of the tapered stepped portion come into face contact with the tapered inner circumferential face of the tapered entrance portion.

Therefore, the relative positional relation between the respective arm leading end portion of the preceding painting robot and the subsequent painting robot and the holder can be maintained to a same positional relation in an even more reliable manner.

A sixth characterizing feature of the present invention relates to the painting facility having the second characterizing feature, according to the characterizing feature:

an arm-holder connecting means for connecting the respective arm leading end portion of the preceding painting robot and the subsequent painting robot to the holder is configured to maintain the connection between the respective arm leading end portion of the preceding painting robot and the subsequent painting robot and the holder by means of a magnetic force or an air suction force.

EFFECT OF INVENTION 6

With the painting facility having the above configuration, a magnetic force or an air suction force of an appropriate magnitude will be selected as the magnetic force or air suction force for maintaining the connection between the respective arm leading end portion of the preceding painting robot and the subsequent painting robot and the holder. With this, in the case of e.g. accidental hitting of the painting object or the holder connected thereto against another object, it is possible to allow the holder connected to the painting object to be released and dropped from the respective arm leading end portion of the preceding painting robot or the subsequent painting robot.

Therefore, damage to the painting robots, the holder and another object due to hitting or collision can be prevented effectively.

A seventh characterizing feature of the present invention relates to the painting facility having the sixth characterizing feature, according to the characterizing feature:

the arm-holder connecting means is configured to maintain the connection between the respective arm leading end portion of the preceding painting robot and the subsequent painting robot and the holder by means of a magnetic force of a permanent magnet; and the preceding painting robot and the subsequent painting robot respectively include a connection releasing means for releasing the connection between the arm leading end portion and the holder against the magnetic force of the permanent magnet, in accordance with an instruction from the controlling means.

EFFECT OF INVENTION 7

With the painting facility having the above configuration, the connection between the respective arm leading end portion of the preceding painting robot and the subsequent painting robot and the holder is maintained by means of a magnetic force of a permanent magnet.

On the other hand, when there arises a need to release the connection between the respective arm leading end portion of the preceding painting robot and the subsequent painting robot and the holder at the time of e.g. transfer of a painting object, this connection can be released easily by an action of the connection releasing means in accordance with an instruction from the controlling means.

An eighth characterizing feature of the present invention relates to the painting facility having the second characterizing feature, according to the characterizing feature:

under the state of the respective arm leading end portion of the preceding painting robot and the subsequent painting robot being connected to the holder;

an abnormality detecting means detects, as occurrence of an abnormality, occurrence of abnormality in the connection between the arm leading end portion and the holder or application of an abnormal external force to the holder connected to the arm leading end portion; and the controlling means executes a predetermined safety operation based on the detection of this abnormality occurrence by this abnormality detecting means.

EFFECT OF INVENTION 8

With the painting facility having the above configuration, for instance, if an abnormality occurs in the connection between the arm leading end portion and the holder due to a certain cause or application of an abnormal external force to the painting object or to the holder connected thereto, such occurrence can be detected by the abnormality detecting means as occurrence of abnormality.

Then, the controlling means executes a predetermined safety operation based on the detection of this abnormality occurrence by this abnormality detecting means.

With the above, it is possible to stop the abnormality occurrence at an early stage of its development or to carry out a certain emergency measure against the abnormality occurrence. Therefore, safety of the painting operation can be enhanced.

A ninth characterizing feature of the present invention relates to the painting facility having the eighth characterizing feature, according to the characterizing feature:

the abnormality detecting means includes:
an air passage which opens in a connection joint face between the respective arm leading end portion of the preceding painting robot and the subsequent painting robot and the holder and which is closed upon establishment of the connection between the respective arm leading end portion and the holder;
a pressure applying means for applying a positive or negative pneumatic pressure to the air passage which is under a closed state; and
a pressure detecting means for detecting the pneumatic pressure in the air passage;

wherein the abnormality occurrence is detected based on a pressure detected by the pressure detecting means.

EFFECT OF INVENTION 9

With the painting facility having the above configuration, at normal time, the air passage is maintained under the closed state by the connection between the respective arm leading end portion of the preceding painting robot and the subsequent painting robot and the holder.

With this, the pressure detected by the pressure detecting means is maintained at the positive or negative pneumatic pressure applied to the closed air passage by the pressure applying means.

And, if there occurs an abnormality in the connection between the arm leading end portion and the holder or an abnormal external force is applied to the holder connected to the arm leading end portion, the air passage opening in the connection joint face between the arm leading end portion and the holder is now opened.

With the above, when there occurs a corresponding change in the pressure detected by the pressure detecting means, the abnormality occurrence is detected.

Therefore, occurrence of abnormality in the connection between the arm leading end portion and the holder or application of an abnormal external force to the holder connected to the arm leading end portion can be detected appropriately as occurrence of abnormality.

A tenth characterizing feature of the present invention relates to the painting facility having the second characterizing feature, according to the characterizing feature:

as a holder-painting object connecting means for connecting the holder to the painting object, a plurality of suckers to be sucked to the painting object are provided in the holder; and wherein the plurality of suckers are disposed in correspondence with a plurality of connection target portions in the painting object.

EFFECT OF INVENTION 10

With the painting facility having the above configuration, the holder is connected to the painting object by sucking the suckers to the respective connection target portions in the painting object.

With the above, when the preceding painting robot or the subsequent painting robot displaces the painting object relative to the spraying means, the relative positional relation between the arm leading end portion of these respective painting robots and the painting object can be maintained to a same positional relation in a stable manner.

Therefor, painting accuracy for the painting object can be increased.

An eleventh characterizing feature of the present invention relates to the painting facility having the second characterizing feature, according to the characterizing feature:

as a holder-painting object connecting means for connecting the holder to the painting object, a sucker to be sucked to the painting object is provided in the holder; and in a suction passage for drawing inside air of the sucker to suck the sucker to the painting object, there is incorporated a check valve or an opening/closing valve for blocking air flow toward the inside of the sucker.

EFFECT OF INVENTION 11

With the painting facility having the above configuration, the sucker is sucked to the painting object by drawing an amount of inside air of the sucker by an appropriate sucking means. Thereafter, by blocking air toward the inside of the sucker by the check valve or opening/closing valve described above, the suction of the sucker to the painting object can be maintained even after air supply by the sucking means is stopped.

With the above, it becomes possible to make continuous suction by the sucking means unnecessary. Accordingly, the running cost of the facility can be reduced.

Incidentally, for releasing the suction of the sucker to the painting object, the interior of the sucker under the sucked state can be released to the atmosphere by an appropriate suction releasing means.

A twelfth characterizing feature of the present invention relates to the painting facility having the eleventh characterizing feature, according to the characterizing feature:

the suction passage is formed inside the holder; and a suction opening of the suction passage opens in the connection joint face between the respective arm leading end portion of the preceding painting robot and the subsequent painting robot and the holder.

EFFECT OF INVENTION 12

With the painting facility having the above configuration, the suction opening of the suction passage is covered or closed in association with establishment of connection between the arm leading end portion of the painting robot and the holder.

Therefore, it is possible to effectively prevent clogging of the suction opening which can occur due to adhesion of excess sprayed paint by the spraying means to the suction opening.

A thirteenth characterizing feature of the present invention relates to the painting facility having the second characterizing feature, according to the characterizing feature:

as a holder-painting object connecting means for connecting the holder to the painting object, a sucker to be sucked to the painting object is provided in the holder and a cover for covering this sucker is provided in the holder; and the cover is configured such that when the sucker is under an un-sucked extended state, a leading end sucking portion of the sucker protrudes from a covering area of the cover, whereas when the sucker is under a sucked contracted state, the leading end sucking portion of the sucker is retracted to the inner side of the covering area of the cover.

EFFECT OF INVENTION 13

With the painting facility having the above configuration, when the sucker is under an un-sucked extended state, a leading end sucking portion of the sucker protrudes from a covering area of the cover, thereby allowing suction of the sucker to the painting object.

Whereas, when the sucker is under a sucked contracted state, the leading end sucking portion of the sucker is retracted to the inner side of the covering area of the cover, whereby adhesion of sprayed paint from the spraying means to the sucker can be prevented.

Therefore, the sucking function of the sucker relative to the painting object can be maintained favorably for a long period of time.

A fourteenth characterizing feature of the present invention relates to the painting facility having the second characterizing feature, according to the characterizing feature:

an arm-holder connecting means for connecting the respective arm leading end portion of the preceding painting robot and the subsequent painting robot to the holder is configured to maintain the connection between the respective arm leading end portion of the preceding painting robot and the subsequent painting robot and the holder by an air suction force generated by a sucking means;

as the holder-painting object connecting means for connecting the holder to the painting object, a sucker to be sucked to the painting object is provided in the holder; and the sucker is configured to be sucked to the painting object by suction of inside air thereof with air suction by the sucking means.

EFFECT OF INVENTION 14

With the painting facility having the above configuration, the inside air of the sucker is sucked by utilizing the sucking means for maintaining connection between the respective arm leading end portion of the preceding painting robot and the subsequent painting robot and the holder, whereby this sucker is sucked to the painting object.

Therefore, in comparison with an arrangement of providing a sucking means for maintaining connection between the arm leading end portion of the painting robot and the holder and a further sucking means for maintaining connection between the holder and the painting object separately, device cost and facility cost can be reduced.

A fifteenth characterizing feature of the present invention relates to the painting facility for implementing the painting method having the first characterizing feature, according to the characterizing feature:

the preceding spraying means is disposed under a downward orientation at an upper portion of the preceding spraying area, whereas the subsequent spraying means is disposed under a downward orientation at an upper portion of the subsequent spraying area;

a preceding robot installing area for installing the preceding painting robot and a subsequent robot installing area for installing the subsequent painting robot are disposed side by side along a painting area juxtaposing direction along which the preceding painting area and the subsequent painting area are juxtaposed and disposed adjacent a lateral side of the respective corresponding painting area; and the transfer section is disposed between the preceding painting robot and the subsequent painting robot in a border portion between the preceding robot installing area and the subsequent robot installing area.

EFFECT OF INVENTION 15

With the painting facility having the above configuration, in addition to the effect achieved by the painting method according to the first characterizing feature described above, an effect as follows can be obtained.

Namely, while the preceding spraying means and the subsequent spraying means are disposed under a downward orientation at the respective upper portions of the preceding painting area and the subsequent painting area, the preceding robot installing area and the subsequent robot installing area are respectively disposed side by side along the painting area juxtaposing direction and adjacent a lateral side of the corresponding painting area.

Therefore, in addition to the above-described possibility of effectively avoiding enlargement of paint scattering area by displacement of the spraying means, adhesion of excess sprayed paint to the preceding painting robot and the subsequent painting robot can be prevented in an even more effective manner.

A sixteenth characterizing feature of the present invention relates to the painting facility according to the fifteenth characterizing feature, according to the characterizing feature:

the preceding painting area and the subsequent painting area are partitioned from each other by an air curtain or a partition wall in the painting area juxtaposing direction; and the preceding robot installing area and the subsequent robot installing area are opened to each other in the painting area juxtaposing direction or partitioned from each other in the painting area juxtaposing direction by an air curtain.

EFFECT OF INVENTION 16

With the painting facility having the above configuration, the preceding painting area and the subsequent painting area are partitioned from each other by an air curtain or a partition wall in the painting area juxtaposing direction.

Whereas, the preceding robot installing area and the subsequent robot installing area are opened to each other in the painting area juxtaposing direction or partitioned from each other in the painting area juxtaposing direction by an air curtain.

Therefore, a so-called "color overlap" due to movement of sprayed paint between the preceding painting area and the subsequent painting area can also be prevented effectively.

Further, in addition to the above-described effective prevention of movement of sprayed paint between the preceding painting area and the subsequent painting area, the transfer section is disposed between the preceding spraying robot and the subsequent spraying robot in the border portion between the preceding robot installing area and the subsequent robot installing area which are opened to each other or partitioned from each other by the air curtain alone.

With the above arrangement, transfer of the painting object between the preceding painting robot and the subsequent painting robot can be effected easily. Therefore, the painting operation between and across the preceding painting area and the subsequent painting area can be effected in an even more efficient manner.

BRIEF DESCRIPTION OF THE DRAWINGS

FIG. 4 is an enlarged view of a holder,

FIG. 7 is a front view of a painting booth showing a further embodiment, FIG. 8 is a sectional view taken along a line VIII-VIII in FIG. 7, FIG. 14 is a front view of a spraying means supporting arrangement showing a further embodiment.

EMBODIMENTS

Figure 1:
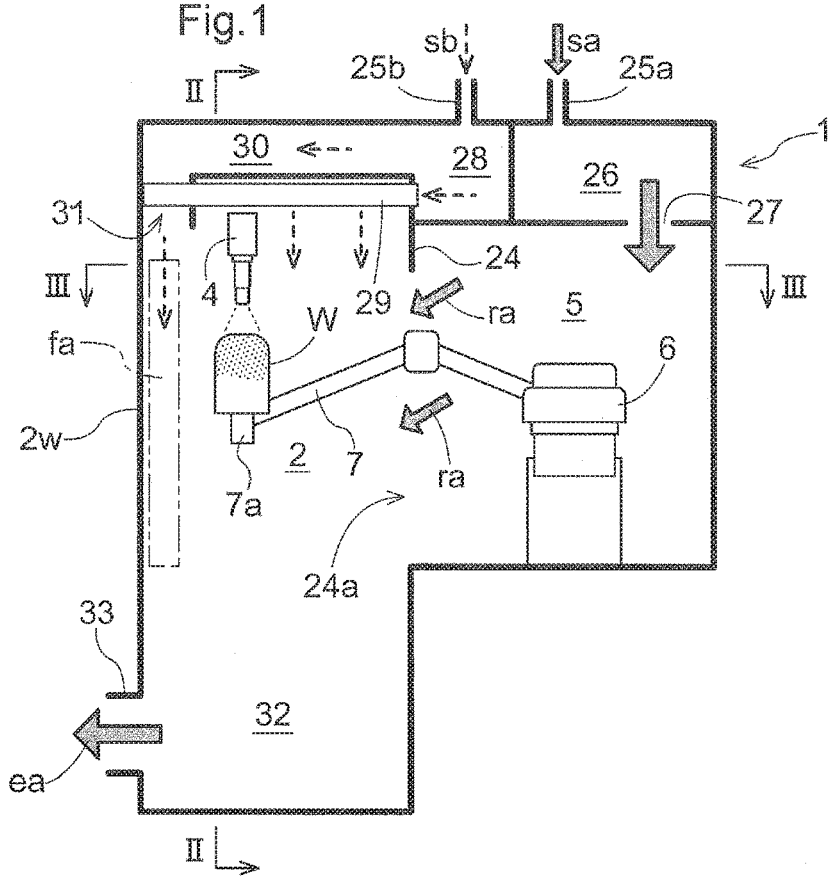
FIG. 1 is a front view of a painting booth.
Figure 2:
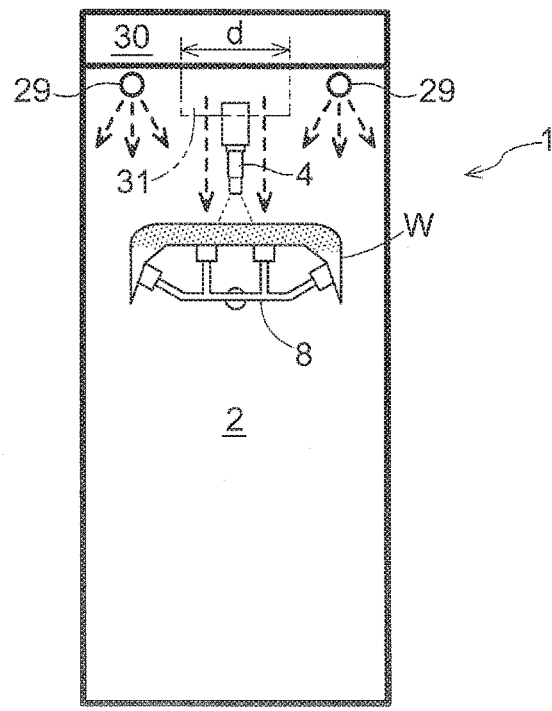
FIG. 2 is a sectional view taken along a line II-II in FIG. 1.
Figure 3:
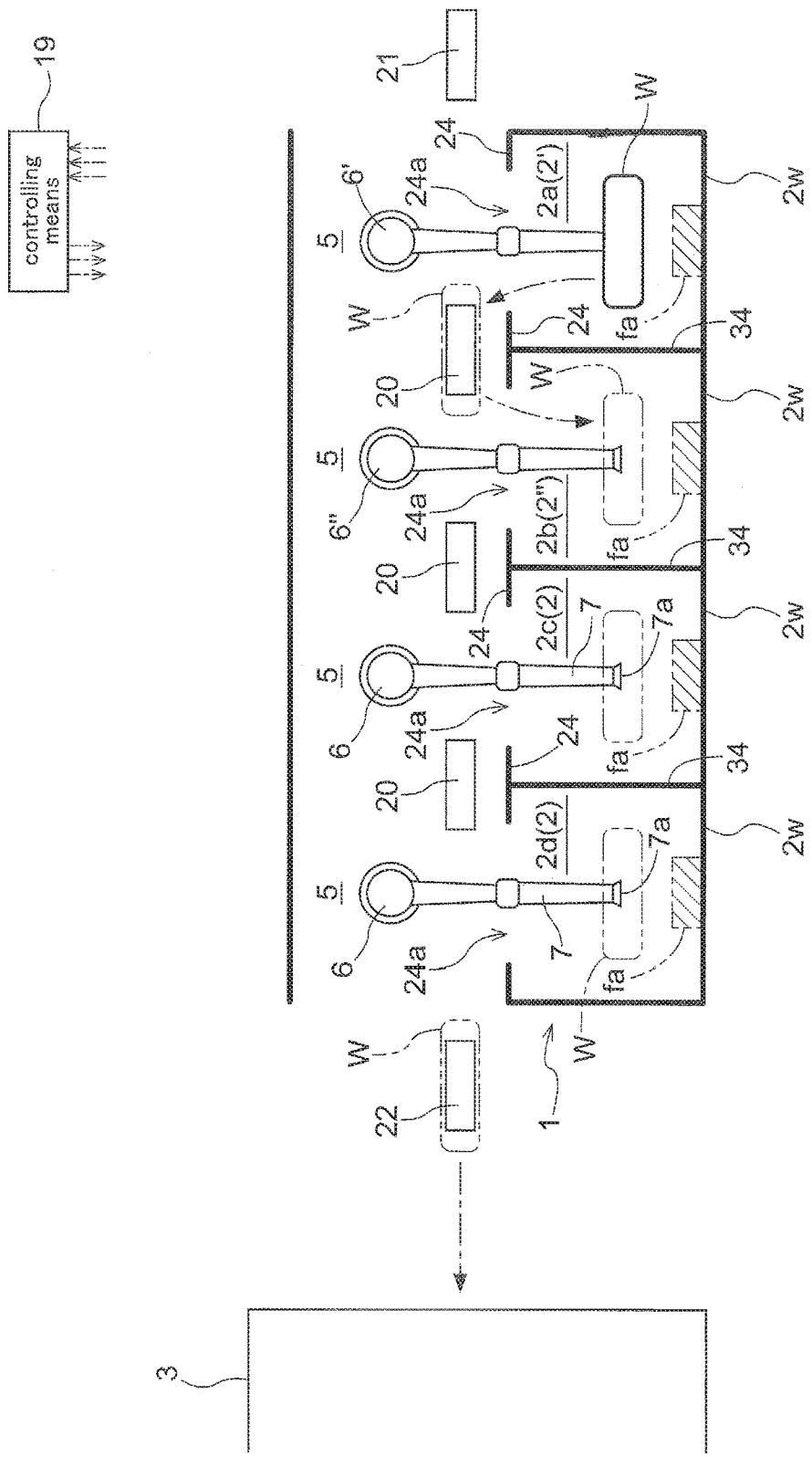
FIG. 3 is a sectional view taken along a line III-III in FIG. 1.

FIGS. 1-3 show a painting booth 1 for painting a painting object W (object to be painted) (a bumper of an automobile in this embodiment).

In this painting booth 1, for instance, four painting areas (=2a-2d) are disposed side by side in one row, and in these painting areas 2, the painting object W is painted in series.

For instance, in the first painting area 2a, primer painting is effected on the painting object W. Further, in the second painting area 2b, No. 1 base painting is effected on the painting object W after the primer painting. And, in the third painting area 2c, No. 2 base painting is effected on the painting object W after the No. 1 base painting.

And, in the fourth painting area 2d, clear painting is effected on the painting object W after the No. 2 base painting. The painting object W after completion of these painting operations is sent to a drying furnace 3 to receive a baking and drying treatment.

At an upper portion of each painting area 2, a spraying means 4 is disposed under a substantially perpendicularly downward orientation. This spraying means 4 sprays predetermined paint onto the painting object W.

On one lateral sides of the respective painting areas 2, robot installing areas 5 provided adjacent the respective painting areas 2 are disposed side by side along the spraying area juxtaposing direction. In these robot installing areas 5, there are respectively installed painting robots 6 for effecting painting operations in the corresponding painting areas 2.

Two painting areas 2 adjacent each other have a mutual relation of a preceding painting area 2' disposed on the upstream side in an advancing direction of the painting object W and a subsequent painting area 2" disposed on the downstream side in the advancing direction of the painting object W.

Specifically, the first painting area 2a is the preceding painting area 2' whereas the second painting area 2b is the subsequent painting area 2" relative thereto. Similarly, the second painting area 2b is the preceding painting area 2' whereas the third painting area 2c is the subsequent painting area 2" relative thereto. Further, the third painting area 2c is the preceding painting area 2' whereas the fourth painting area 2d is the subsequent painting area 2" relative thereto.

This preceding/subsequent relation applies also to the spraying means 4, the robot installing areas 5, and the painting robots 6, respectively.

In each painting area 2, the painting object W is held to a leading end portion 7a of an arm 7 of each painting robot 6 as being connected via a branch-like holder 8.

This holder 8, as shown in FIG. 4, includes a plurality of suckers 9 to be sucked to the painting object W as "a holder-painting object connecting means" for connecting this holder 8 to the painting object W.

These suckers 9 are provided in the holder 8 as being disposed in correspondence with a plurality of connection target positions in the painting object W (in this example, back face portions at the opposed ends at a front portion of the bumper and back face portions at opposed lateral portions of the bumper).

The holder 8 is formed of a pipe member. An inner hole of this pipe member (pipe hole) constitutes a suction passage 10 for sucking air inside the suckers 9 by a sucking means (not shown). By this suction of the inside air of the suckers 9 via the suction passage 10 by the sucking means, the suckers 9 are sucked to the painting object W, whereby the holder 8 is connected to the painting object W.

The suction passage 10 consists of a main suction passage 10b continuous to a suction opening 10a connected to the sucking means and branch suction passages 10c branching from the main suction passage 10b and opening to the insides of the respective suckers 9.

The main suction passage 10b incorporates a check valve 11 of e.g. a ball type. This check valve 11 of a ball type or the like allows flow of air from the inside of each sucker 9 toward the suction opening 10a (namely, air suction by the sucking means connected to the suction opening 10a). And, this ball-type or the like check valve 11 automatically shuts off reverse air flow (i.e. air flow from the suction opening 10a toward the inside of each sucker 9).

Namely, with air suction by the sucking means, each sucker 9 is sucked to the painting object W. Thereafter, even after the sucking means is detached from the suction opening 10a, reverse air flow (in other words, opening-up of each sucker 9 to the atmosphere) is prevented by this check valve 11. Therefore, the sucked state of each sucker 9 to the painting object W is maintained. With this, the connection between the holder 8 and the painting object W is maintained.

The holder 8 includes covers 12 for the respective suckers 9. When the sucker 9 is under a non-sucked expanded state, a leading end sucking portion of the sucker 9 protrudes from the covering area of the cover 12.

Conversely, when the sucker 9 is under a sucked contracted state, the leading end sucking portion of the sucker 9 is retracted toward the inner side of the covering area of the cover 12.

Namely, with provision of this cover 12, it is possible to effectively prevent adherence of excess sprayed paint to the sucker 9 while allowing suction of the sucker 9 to the painting object W.

Figure 5A:
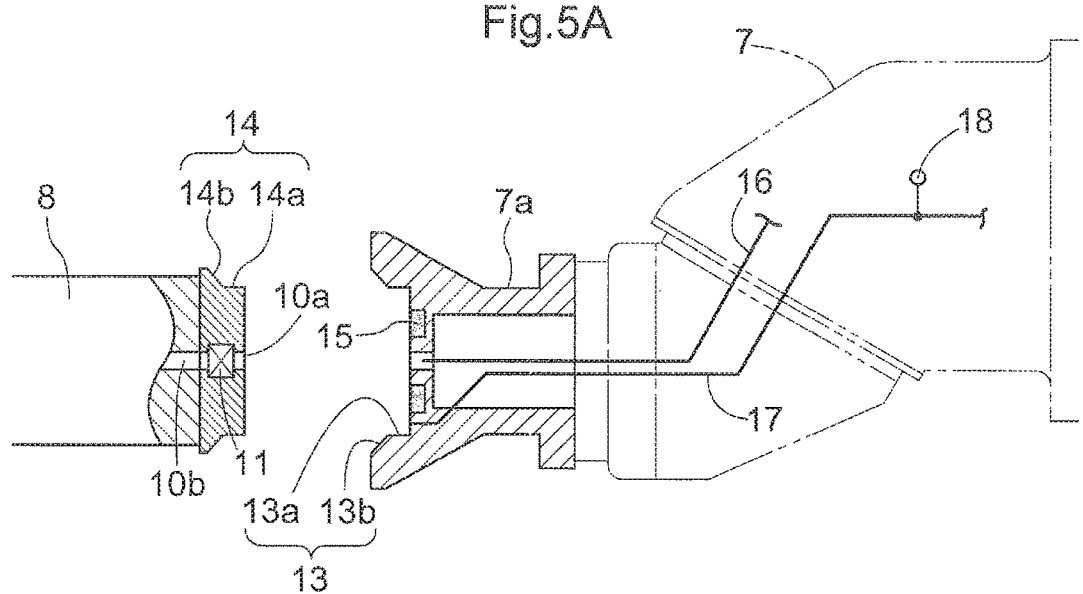
FIGS. 5A and 5B are enlarged section views showing a connection arrangement between an arm leading end portion and the holder.
Figure 5B:
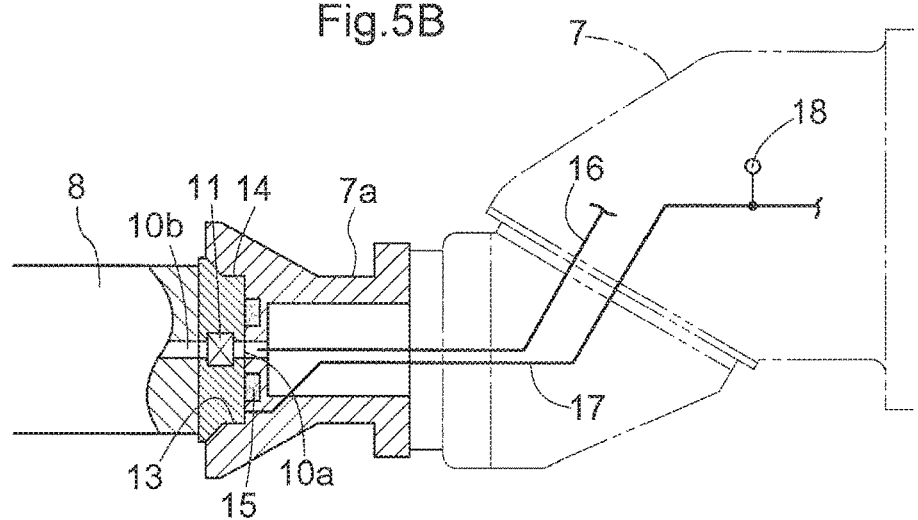

On the other hand, as an "arm-holder connecting means" for connecting the arm leading end portion 7a of each painting robot 6 to the holder 8, as shown in FIG. 5, a connection hole 13 is provided in the arm leading end portion 7a of the respective painting robot 6, and in correspondence with this connection hole 13, a connection projection 14 to be inserted and fitted into the connection hole 13 is formed on the holder 8.

In the connection hole 13 of each arm leading end portion 7a, there are formed coaxially a straight hole portion 13a having a cylindrical inner circumferential face and a tapered entrance portion 13b having a tapered inner circumferential face whose diameter progressively increases toward a hole entrance.

On the other hand, in the connection projection 14 of the holder 8, there are formed coaxially a column-like leading end portion 14a to be fitted into the straight hole portion 13a of the connection hole 13 and a tapered stepped portion 14b to be fitted into the tapered entrance portion 13b of the connection hole 13.

Namely, when the connection projection 14 of the holder 8 is to be inserted and fitted into the connection hole 13 of the respective arm leading end portion 7a, the column-like leading end portion 14a of the connection projection 14 will be brought into sliding contact with the tapered inner circumferential face of the tapered entrance portion 13ab of the connection hole 13, whereby the connection projection 14 can be guided to the center of the connection hole 13 smoothly.

And, with completion of the above insertion fitting, a column-like outer circumferential face of the column-like leading end portion 14a of the connection projection 14 is brought into face contact with the cylindrical inner circumferential face of the straight hole portion 13a of the connection hole 13. Also, a tapered outer circumferential face of the tapered stepped portion 14b of the connection projection 14 is brought into face contact with the tapered inner circumferential face of the tapered entrance portion 13b of the connection hole 13.

With the above, the arm leading end portion 7a of the respective painting robot 6 is connected to the holder 8 with high connection accuracy in a reliable manner.

Incidentally, the suction opening 10a of the suction passage 10 in the holder 8 opens in a connection alignment face between the arm leading end portion 7a and the holder 8 (specifically, the leading end face portion of the connection projection 14).

In the connection hole 13 of the respective arm leading end portion 7a, a permanent magnet 15 is provided. This permanent magnet 15 provides a magnetic sucking action to the connection projection 14 of the holder 8 as being inserted/fitted into the connection hole 13.

In the connection hole 13 of the respective arm leading end portion 7a, an arm side suction passage 16 is opened. This arm side suction passage 16 provides an air suction force between the connection hole 13 and the connection projection 14 inserted/fitted therein.

Namely, with the magnetic force from the permanent magnet 15 together with the air suction force applied via the arm side suction passage 16, the inserted/fitted state between the insertion hole 13 and the connection projection 14 is maintained. With this, the connection between the arm leading end portion 7a of the respective painting robot 6 and the holder 8 is maintained.

In the connection hole 13 of the respective arm leading end portion 7a, separately from the arm side suction passage 16 for the holder connection, a detection air passage 17 is formed. This detection air passage 17 is opened in the inner face of the connection hole 13 which constitutes "a connection joint face" between the arm leading end portion 7a and the holder 8.

Therefore, this detection air passage 17 is closed upon establishment of connection between the arm leading end portion 7a and the holder 8 (that is, insertion/fitting of the connection projection 14 into the connection hole 13).

Each painting robot 6 mounts a pressure applying means (not shown). This pressure applying means applies a predetermined positive pressure by supply of compressed air to the detection air passage 17 which is now closed in association with the establishment of connection between the arm leading end portion 7a and the holder 8.

The respective painting robot 6 also mounts a pressure detecting means 18. This pressure detecting means 18 detects air pressure in the detection air passage 17.

Namely, when a certain abnormality occurs in the connection between the respective arm leading end portion 7a of the respective painting robot 6 and the holder 8 or an abnormal external force is applied to the holder due to e.g. accidental collision between the panting object W or the holder 8 with another object, there occurs reduction in the applied pressure in the detection air passage 17 due to opening of the detection air passage 17 associated therewith.

As this reduction of applied pressure is detected by the pressure detecting means 18, the connection abnormality or abnormal external force is detected.

And, when abnormality is detected by this pressure detecting means 18, a controlling means 19 executes a predetermined safety measure such as emergency stop of movements of the respective painting robot 6 or issuance of an alarm.

Incidentally, in the inner face of the connection hole 13 and at the opening of the detection air passage 17, there is provided a ring-shaped seal (not shown) for surrounding this opening. This seal partitions between an area where air suction force is applied via the arm side suction passage 16 and an area where the positive pressure is applied via the detection air passage 17.

The controlling means 19 automatically operates the respective painting robot 6 according to a preset operational program.

In each painting area 2, as described above, the painting object W is connected via the holder 8 to the arm leading end portion 7*a* of the respective painting robot 6. Under this state, with an automatic action of the painting robots 6, the painting object W is painted by downward paint spraying from the spraying means 4 while this painting object W is being displaced relative to the spraying means 4.

In the course of the above-described painting, the controlling means 19 displaces the painting object W relative to the spraying means 4 while changing the posture of the painting object W in such a manner as to maintain a painting progress face in the painting object W at each timing at a posture perpendicular to the direction of paint spraying from the spraying means 4.

At a border between adjacent robot installing areas 5 and between the respective painting robots 6, a transfer section 20 is provided. In this transfer section 20, reception and transfer of the painting object W between the adjacent painting robots 6 are effected.

Namely, the painting object W after completion of painting in the preceding painting area 2' is sent via this transfer section 20 to the subsequent painting area 2".

More particularly, according to the controlling means 19, after completion of the preceding painting in the preceding painting area 2', the painting object W together with the holder 8 is held to the transfer section 20 between the preceding painting robot 6' and the subsequent painting robot 6", by an action of the preceding painting robot 6'.

Then, while the connection between the painting object W and the holder 8 is being maintained, the connection between the arm leading end portion 7*a* of the preceding painting robot 6' and the holder 8 is released.

In succession, the arm leading end portion 7*a* of the preceding painting robot 6' is retracted away from the transfer section 20. Thereafter, with an action of the subsequent painting robot 6", the arm leading end portion 7*a* of this subsequent painting robot 6" is connected to the holder 8 which is being supported to the transfer section 20, with its connection to the painting object W being maintained. Then, the process shifts to a subsequent painting in the subsequent painting area 2".

Incidentally, at the arm leading end portion 7*a* of each painting robot 6, there is mounted a connection releasing means (not shown).

This connection releasing means, when the air suction via the arm side suction passage 16 for holder connection is stopped, removes the connection projection 14 away from the connection hole 13 against the magnetic force of the permanent magnet 15, thereby to release the connection between the arm leading end portion 7*a* and the holder 8.

That is, the controlling means 19 stops the air suction via the arm side suction passage 16 and automatically operates the connection releasing means, thereby to release the connection the arm leading end portion 7*a* of the preceding painting robot 6' and the holder 8 in the transfer section 20.

Incidentally, the painting object W connected with the holder 8 in advance and introduced into the first painting area 2*a* will be caused to be held to the transfer section 21 adjacent the first painting area 2*a* by an operator or another robot.

On the other hand, by an action of the painting robot 6 for the first painting area 2*a*, the arm leading portion 7*a* of this painting robot 6 with its connection to the painting object W maintained will be connected to the holder 8 held to the transfer section 21, with its connection to the painting object W being maintained. And, the process shifts to the painting in the first painting area 2*a*.

Further, the painting object W after completion of its painting in the last fourth painting area 2*d* is mounted together with the holder 8 on a transport cart 22 in the vicinity of the fourth painting area 2*d*, by an action of the painting robot 6 for this fourth painting area 2*d*. Then, the connection between the arm leading end portion 7*a* of the painting robot 6 and the holder 8 is released. Thereafter, the painting object W, together with the holder 8 and the transport cart 22, will be sent into a drying furnace 3.

In the above, the painting object W is softened by heat environment in the drying furnace 3. To this, by opening up the inside negative pressure of each sucker 9 of the holder 8 to the atmosphere, deformation of sucker suction portions in the painting object W is prevented.

Between each painting area 2 and each robot installing area 5 correspondingly adjacent thereto, there is provided a partition wall 24. In this partition wall 24, there is defined a work opening 24*a* that allows the arm 7 of the painting robot 6 installed in the robot installing area 5 to extend into the corresponding painting area 2.

Further, at a ceiling bosom portion of the respective robot installing are 5, there is provided an air feeding chamber 26 for robot installing area. This air feeding chamber 26 for robot installing area receives ventilation air (sa) fed from a ventilation machine (not show) through an air feeding passage 25*a* for robot installing area.

In a ceiling portion of each robot installing area 5 acting also as a lower wall of this air feeding chamber 26, an air feeding opening 27 is provided. This air feeding opening 27 blows the ventilation air (sa) received into the air feeding chamber 26 out into the respective robot installing area 5.

On the other hand, at a painting area side portion of the ceiling bosom portion of each robot installing area 5, an air feeding chamber 28 for the painting area is provided. This painting area air feeding chamber 28 receives ventilation air (sb) fed from the air ventilation machine via a painting area air feeding passage 25*b*.

Further, there are provided two sock filters 29 (cylindrical filters) which extend from the painting area air feeding chamber 28 to one lateral wall 2*w* of each painting area 2. These sock filters 29 are arranged such that the spraying means 4 is disposed at the center portion between these sock filters 29 as viewed in a plan view.

That is, in each painting area 2, the ventilation air (sb) received in the painting area air feeding chamber 28 is fed to upper portions of the respective painting area 2 via these two sock filters 29.

At an upper portion of each painting area 2 and upwardly of the two sock filters 29, an over duct 30 is provided. This over duct 30 has a duct width extending over the substantially entire region of the respective painting area 2 as seen in the plan view and extends from the painting area air feeding chamber 28 to the one lateral wall 2w of the respective painting area 2.

In a bottom face at a leading end portion of this over duct 30, there is formed an air feeding opening 31 for air curtain. This air curtain air feeding opening 31 forms an air curtain (fa) which flows downward along the one lateral wall 2w of the respective painting area 2.

More particularly, a portion of the ventilation air received in the painting area air feeding chamber 28 is blown down from the air curtain air feeding opening 31 via the over duct 30. With this, there is formed the air curtain (fa) which flows down along the one lateral wall 2w of the respective painting area 2.

The air curtain air feeding opening 31 is disposed coaxially with the spraying means in the direction of width of the respective painting area 2.

Further, the width size (d) of the air curtain air feeding opening 31 (in other words, the width size of the air curtain (fa)) is smaller than the width size of the painting area one lateral wall 2w and is also smaller than a spacing distance between the two sock filters 29.

Downwardly of each painting area 2, there is formed an air discharging area 32. This air discharging area 32 receives air (ea) discharged downward from the painting area 2 in association with air feeding to the painting area 2 and air feeding to the corresponding robot installing area 5. And, the air (ea) received in this air discharging area 32 is discharged by an air discharging fan (not shown) via an air discharging passage 33.

Incidentally, if excess sprayed paint contained in the discharge air (ea) from the painting area 2 is to be collected by dry type collection technique, in the air discharging area 32, the discharge air (ea) will be mixed with a powder-like collection aiding substance and on the downstream side of the air discharging passage 33, the excess sprayed paint together with the collection aiding substance may be collected by a filter.

Also, if excess sprayed paint contained in the discharge air (ea) from the painting area 2 is to be collected by wet type collection technique, a wet type collection device for excess sprayed paint may be disposed in the air discharging area 32.

Therefore, each painting area 5 is maintained at a higher pressure than the adjacent painting area 2. From these robot installing areas 5, there will be formed a horizontal or obliquely downward air flow (ra) flowing into the corresponding painting area 2 through the work opening 24a defined in the partition wall 24.

With this air flow (ra), scattering of excess sprayed paint toward the robot installing area 5 will be prevented in the respective painting area 2.

Namely, in addition to the restriction of paint scattering by the downward paint spraying of the spraying means 4, as scattering of excess sprayed paint toward the robot installing area 5 by the above-described air flow (ra), adhesion of excess sprayed paint to the main body of the spraying robot 6 and adhesion of excess sprayed paint to the arm 7 of the painting robot 6 can be prevented effectively.

Further, with formation of the air curtain (fa) flowing downward along the one lateral wall 2w of the respective painting area 2, excess sprayed paint flowing toward the one lateral wall 2w of the painting area 2 will be entrapped by the air curtain (fa). With this, adhesion of excess sprayed paint to the one lateral wall 2w of the respective painting area 2 too can be prevented in a reliable manner.

That is, as paint scattering is restricted by the downward paint spraying by the spraying means 4 as described above, the extending width of the excess sprayed paint toward the one lateral wall 2w of the painting area 2 too can be restricted small. For this reason, even when the air curtain (fa) has only a small width size (d), the paint adhesion of the one lateral wall 2w of the respective painting area 2 can be prevented effectively.

Incidentally, adjacent painting areas 2 are partitioned from each other by the partition wall 34 or a hanging wall or air curtain. With this arrangement, relative movement of excess sprayed paint between adjacent painting areas 2 (i.e. between the preceding painting area 2' and the subsequent painting area 2") is prevented.

On the other hand, adjacent robot installing areas 5 are kept open to each other or partitioned, if any, by an air curtain, from each other. With this arrangement, reception and transfer of the painting object W via the transfer section 20 between the adjacent robot installing areas 5 (i.e. between the preceding painting robot 6' and the subsequent painting robot 6") is made easy.

[Other Embodiments]

Next, other embodiments of the present invention will be described one by one.

The transfer section 20 used for holding the painting object W as being connected to the holder 8 is not limited to the type configured to hold the painting object W and the holder 8 as being mounted thereon. Alternatively, this transfer section 20 can be configured as a type holding the painting object W and the holder 8 as being hung therefrom. Namely, in embodying the present invention, the manner of holding the painting object W in the transfer section 20 can vary in many ways.

The number of the painting areas 2 to be installed can be any number which includes at least two or more painting areas 2 having the relation of the preceding painting area 2' and the subsequent painting area 2".

The spraying means 4 respectively of the preceding painting area 2' and the subsequent painting area 2" is not limited to the one which sprays paint perpendicularly downwards. This spraying means 4 can spray paint obliquely downward or horizontally. Further, this spraying means 4 can be configured to be capable of changing its spraying direction.

A plurality of spraying means 4 can be installed in the preceding painting area 2' or the subsequent painting area 2". These multiple spraying means 4 will be selectively used, depending on the kind of the painting object W or the kind of the sprayed paint.

The specific shape and configuration of the holder 8 are not limited to those shown in the foregoing embodiment. The shape and configuration of the holder 8 can vary in any ways, depending on the painting object W.

In the foregoing embodiment, it was shown that the holder 8 is formed of a pipe member and the inner hole (pipe hole) of this pipe member constitutes to the suction passage 10 for the respective suckers 9.

Instead, the suction passage 10 for the respective suckers 9 can be constituted of a tube attached to the outer circumferential side of the holder 8.

The connection hole 13 can have an angular cross section, instead of the circular cross section. In this case, the connection projection 14 to be inserted and fitted in this connection hole 13 too will have an angular cross section, instead of the circular cross section.

Further, instead of the arrangement wherein the connection hole 13 is provided in the arm leading end portion 7a of the painting robot 6, the connection hole 13 can be provided in the holder 8. In such case, the connection projection 14 will be provided not in the holder 8, but in the arm leading end portion 7a of the painting robot 6.

The arm-holder connecting means can be configured to hold the connection between the arm leading end portion 7a and the holder 8, by the magnetic force of the permanent magnet 15 only or the air suction force only.

Further alternatively, the arm-holder connecting means can be configured to hold the connection between the arm leading end portion 7a and the holder 8, by a magnetic force of an electromagnet or by magnetic force of an electromagnet in combination with air suction force.

Namely, the specific mode of connection of the arm-holder connecting means can vary in many ways.

The arm-holder connecting means is not limited to the one comprised of the connection hole 13 and the connection projection 14 to be inserted and fitted therein. For instance, the arm-holder connecting means can employ an air-chuck arrangement, etc. The configuration of the arm-holder connecting means can vary in many ways.

The pressure applying means for applying a pressure to the detection air passage 17 which is closed in association with establishment of connection between the arm leading end portion 7a and the holder 8 can be configured to apply a negative pressure to the detection air passage 17.

Figure 6:
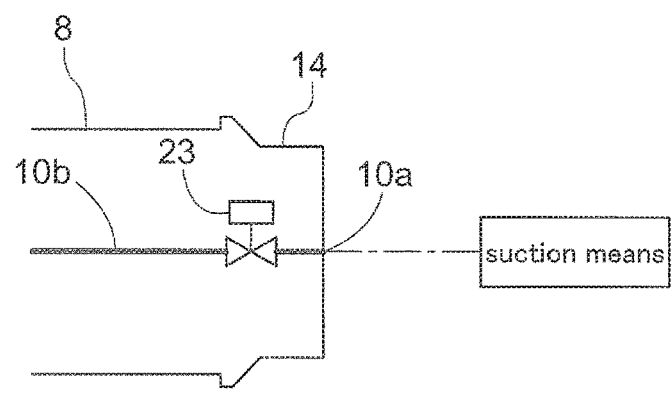
FIG. 6 is an enlarged view of a holder showing a further embodiment.

In the foregoing embodiment, there was shown an arrangement in which the sucked state of the sucker 9 to the painting object W is maintained by blocking the air flow toward the inside of the sucker 9 by the check valve 11. However, instead of this check valve, as shown in FIG. 6, an opening/closing valve 23 may be incorporated in the main suction passage 10b of the holder 8, for instance.

Namely, when the sucker 9 is to be held under a sucked state to the painting object W, this opening/closing valve 23 will be closed in response to a command via a wireless signal from the controlling means 19, for instance.

On the other hand, when the sucker 9 is to be sucked to the painting object W by suction of the air inside the sucker 9 by the sucking means or the sucked state of the sucker 9 to the painting object W is to be released by opening up the inside of the sucker 9 to the atmosphere, this opening/closing valve 23 will be opened in response to a command via a wireless signal from the controlling means 19, for instance.

Further, in the foregoing embodiment, the sucking means (not shown) is connected to the suction opening 10a of the suction passage 10 only when the sucker 9 is to be sucked to the painting object W by suction of the inside air of the sucker 9. Instead of this, the sucker 9 may be sucked to the painting object W by suction of the inside air of the sucker 9 with utilization of air suction force applied through the arm side suction passage 16 which maintains the connection between the arm leading end portion 7a and the holder 8.

The suction opening 10a of the suction passage 10 in the holder 8 need not be opened in the connection joint face between the arm leading end portion 7a and the holder 8. Instead, the suction opening 10a of the suction passage 10 can be opened in a different portion.

Figure 9:
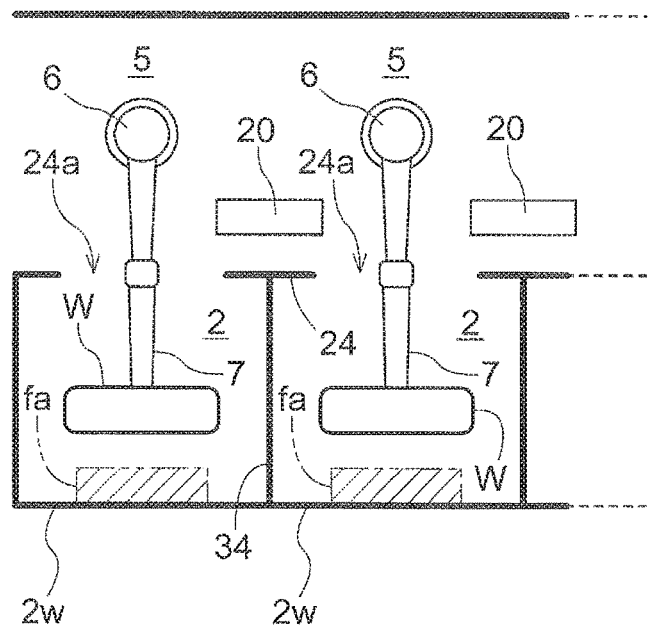
FIG. 9 is a sectional view taken along a line IX-IX in FIG. 7.

The air feeding arrangement for the respective painting area 2 can be arrangements shown in FIGS. 7-9.

Namely, a nozzle box 35 for air-curtain defining an air-curtain air feeding opening 31 in a lower face thereof is disposed at an upper portion of the one lateral wall 2w of each painting area 2.

And, the sock filters 29 which extend from the painting area air feeding chamber 28 are caused to extend to the lateral face of the air-curtain nozzle box 35. And, the leading end portions of these sock filter 29 are opened to the inside of the air-curtain nozzle box 35 via a throttle opening 35a.

Namely, with this air feeding arrangement, in parallel with feeding of a portion of the ventilation air (sb) received in the painting area air feeding chamber 28 via the two sock filters 29 to the upper portion of the respective painting area 2, the other portion of the ventilation air (sb) received in the painting area air feeding chamber 28 is fed via the two sock filter 29 to the air-curtain nozzle box 35.

With the above, as air is discharged from the air-curtain air feeding opening 31, there is formed an air curtain (fa) which extends along the one lateral wall 2w of the painting area 2.

Figure 10:
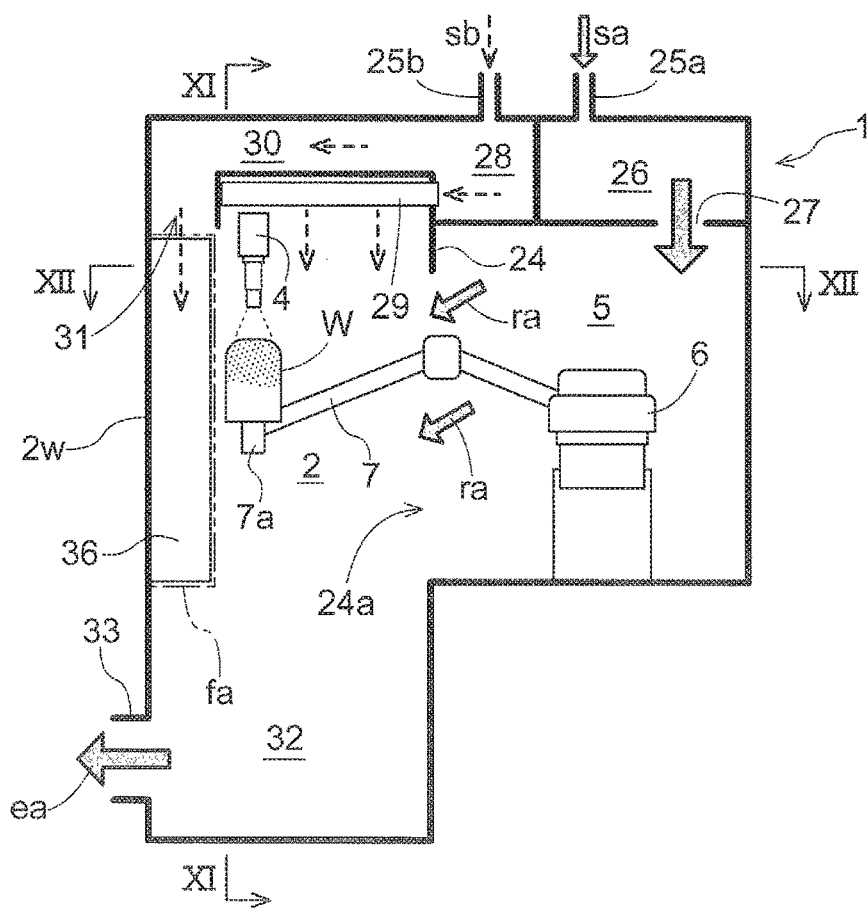
FIG. 10 is a front view of a painting booth showing a further embodiment.
Figure 11:
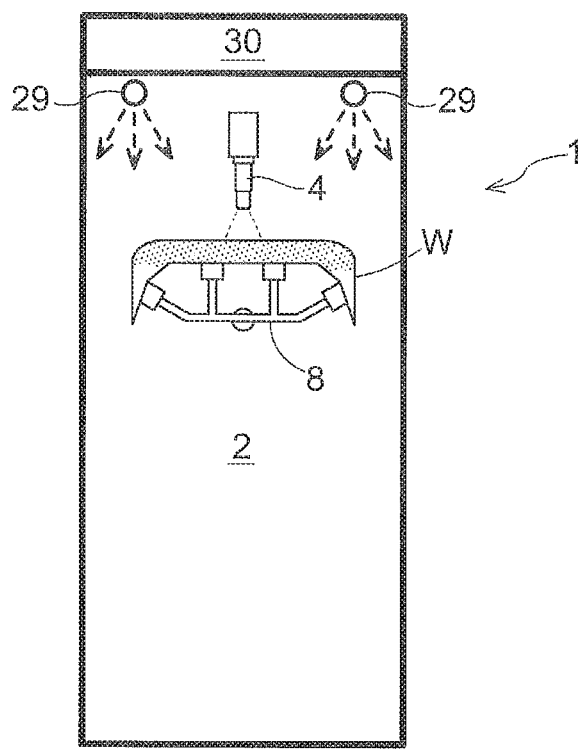
FIG. 11 is a sectional view taken along a line XI-XI in FIG. 10.
Figure 12:
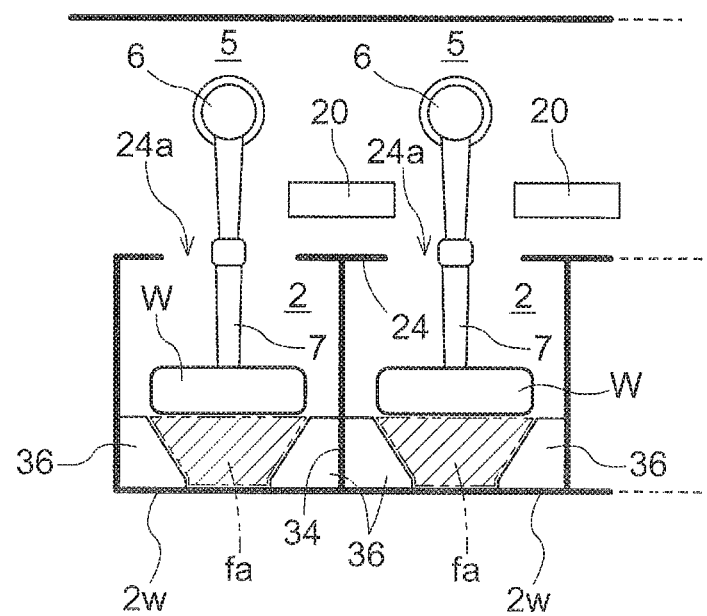
FIG. 12 is a sectional view taken along a line XII-XII in FIG. 10.

The air feeding arrangement for the respective painting area 2 can be arrangements shown in FIGS. 10-12.

Namely, on opposed end corner portions of the one lateral wall 2w of each painting area 2, there are formed paint tank installing chambers 36 which extend along the entire height of the painting area 2. The cross sectional shape of these paint tank installing chambers 36 as seen in a plan view is set as an approximately triangular shape which is contained within the opposed end corner portions of the one lateral wall 2w of the painting area 2.

And, the plan-view shape of the air-curtain air feeding opening 31 (namely, the plan view cross sectional shape of the air curtain (fa)) is set as a trapezoidal shape surrounded by the bottom side of the triangular cross sectional shape of these paint tank installing chambers 36 and the one lateral wall 2w of the painting area 2.

Namely, with this air feeding arrangement, thanks to the air curtain (fa), it is possible to prevent adhesion of excess sprayed paint to the one lateral wall 2w of the painting area 2, but also adhesion of excess sprayed paint to the chamber walls of the paint tank installing chambers 36.

Figure 13:
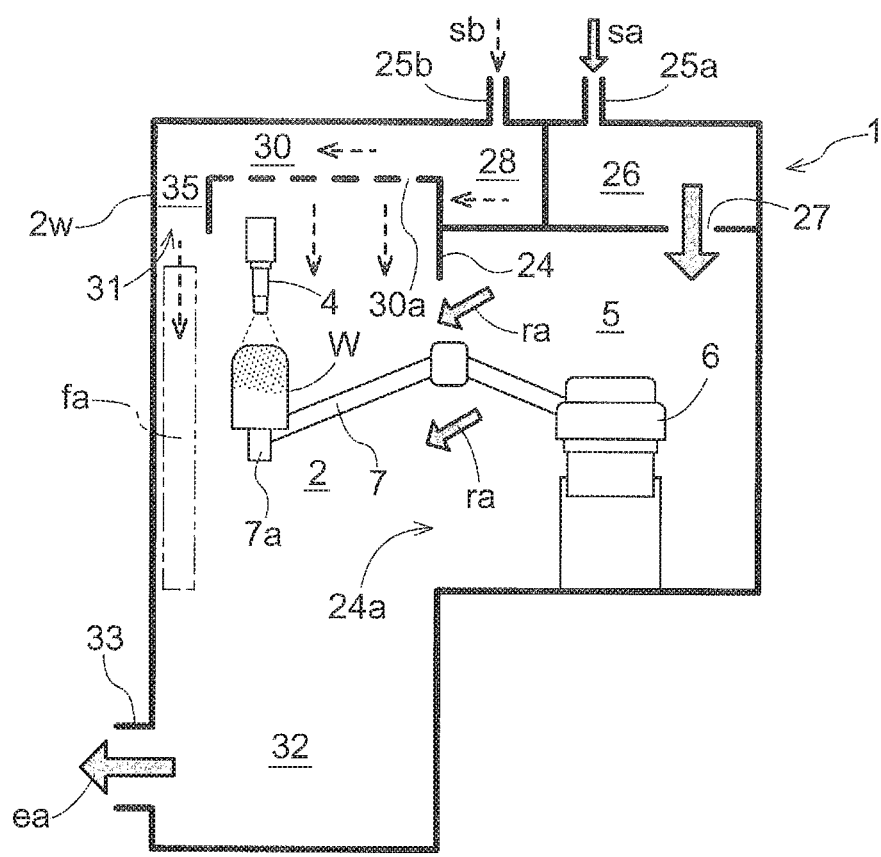
FIG. 13 is a front view of a painting booth showing a further embodiment.

The air feeding arrangement for the respective painting area 2 can be an arrangement shown in FIG. 13.

Namely, a lower wall 30a of the over duct 30 provided at the upper portion of the respective painting area 2 is provided with a porous structure by means of a punching plate, a filter or the like. With this, the sock filters 29 are omitted and the ventilation air (sb) is discharged and fed to the upper portion of the painting area 2 via the lower wall porous structure of the over duct 30.

The painting robot 6 to be installed in the respective robot installing area 5 is not limited to the floor mount type. The painting robot 6 to be installed in the respective robot installing area 5 can be any installment type such as a wall hung type or ceiling suspended type, etc.

Further, the spraying means 4 can be disposed to be liftable up/down in the painting area 2. With this, maintenance for the spraying means 4 can be carried out easily.

And, in this case, as shown in FIG. 14 for example, a downwardly directed spraying means 4 will be attached to a pivot end of a parallel link mechanism 37 which is vertically pivotable. And, there is provided an urging means 38 such as a weight for urging this parallel link mechanism 37 to the rising pivotal side. Further, there is provided a limit restricting means 39 such as a buffer air cylinder for restricting a pivotal range of the parallel link mechanism 37.

Namely, with this arrangement, normally, the parallel link mechanism 37 will be pivotally raised to an upper limit position restricted by the limit restricting means 39. With this, the spraying means 4 under the downwardly oriented posture can be maintained at an upper position in the painting area 2. And, under this state, the spraying means 4 can spray paint onto the painting object W.

On the other hand, at the time of e.g. maintenance operation for the spraying means 4, against the urging force of the urging means 38, the parallel link mechanism 37 will be pivotally lowered to a lower limit position where this parallel link mechanism 37 assumes a perpendicularly downward orientation. In association with this, as the urging direction of the urging means 38 is reversed, the spraying means 4 under the downward oriented posture will be maintained at a lower position in the painting area 2. And, under this state, maintenance operation for the spraying means 4 can be carried out.

INDUSTRIAL APPLICABILITY

The object to be painted (i.e. "painting object") by the inventive painting method and painting facility is not limited to a bumper of an automobile. Namely, the inventive painting method and painting facility can be used for painting of a variety of objects.

DESCRIPTION OF REFERENCE MARKS/NUMERALS

6: painting robot
7: arm
7a: arm leading end
8: holder
W: painting object (object to be painted)
4: spraying means
2': preceding painting area
6': preceding painting robot
4': preceding spraying means
2": subsequent painting area
6": subsequent painting robot
4": subsequent spraying means
20: transfer section
19: controlling mans
13: connection hole
14: connection projection
13b: tapered entrance portion
14: tapered stepped portion
15: permanent magnet
17: air passage
18: pressure detecting means
9: sucker
10: suction passage
11: check valve
23: opening/closing valve
10a: suction opening
12: cover
5': preceding robot installing area
5": subsequent robot installing area
34: partition wall or air curtain

The invention claimed is:
1. A painting facility, comprising:
a preceding painting area equipped with a preceding sprayer for effecting a preceding painting operation on a painting object by paint spraying;
a preceding painting robot as a part of a painting robot having an arm leading end portion and while effecting the preceding painting operation on the painting object, displacing the painting object relative to the preceding sprayer by an action of the preceding painting robot, keeping the painting object connected to the arm leading end portion of the preceding painting robot;
a subsequent painting area equipped with a subsequent sprayer for effecting a subsequent painting operation on the painting object by paint spraying;
a subsequent painting robot as a part of the painting robot having an arm leading end portion and, which, while effecting the subsequent painting operation on the painting object, displaces the painting object relative to the subsequent sprayer by an action of the subsequent painting robot, while keeping the painting object connected to the arm leading end portion of the subsequent painting robot;
a holder via which the painting object is connected to the arm leading end portion of each of the preceding painting robot and the subsequent painting robot;
a transfer section located near the preceding painting area and the subsequent painting area; and
a controller for causing the preceding painting robot and the subsequent painting robot respectively to act automatically in accordance with a preset operational program;
wherein, after completion of the preceding painting operation in the preceding painting area, the controller causes the painting object connected to the arm leading end portion of the preceding painting robot via the holder to be held to the transfer section by an action of the preceding painting robot with the holder, and connection between the arm leading end portion of the preceding painting robot and the holder is released, while keeping connection between the painting object and the holder, and
wherein subsequently, while the arm leading end portion of the preceding painting robot is retracted from the transfer section, by an action of the subsequent painting robot, the controller causes the arm leading end portion of the subsequent painting robot, while keeping the connection thereof to the painting object, to be connected to the holder, which is being held to the transfer section, such that the painting object is shifted to the subsequent painting operation in the subsequent painting area in succession.

2. The painting facility according to claim 1, wherein in the execution of the automatic action of the preceding painting robot and the subsequent painting robot in accordance with the preset operational program, the controller displaces the painting object relative to the preceding sprayer and the subsequent sprayer, with varying the posture of the painting object in such a manner to maintain a painting progress face at each timing of the painting object perpendicular to a paint spraying direction from the preceding sprayer and the subsequent sprayer.

3. The painting facility according to claim 1, wherein:
one of the respective arm leading portion of the preceding painting robot and the subsequent painting robot and the holder defines a connection hole and the other forms a connection projection to be fitted into the connection hole;
in the connection hole, there is formed a tapered entrance portion having a tapered inner circumferential face whose diameter progressively increases toward a hole entrance, the tapered entrance portion guiding the connection projection to a center of the connection hole by causing the tapered inner circumferential face into sliding contact with the connection projection in association with fitting of the connection projection into the connection hole.

4. The painting facility according to claim 3, wherein in the connection projection, there is formed a tapered stepped portion which fits into the tapered entrance portion when a tapered outer circumferential face thereof comes into face contact with the tapered inner circumferential face of the tapered entrance portion, with fitting of the connection projection into the connection hole.

5. The painting facility according to claim 1, wherein the arm leading end portion of the preceding painting robot and the arm leading end portion of the subsequent painting robot are configured to maintain a connection to the holder by a magnetic force or an air suction force.

6. The painting facility according to claim 5, wherein:
the arm leading end portion of the preceding painting robot and the arm leading end portion of the subsequent painting robot are configured to maintain the connection to the holder by a magnetic force of a permanent magnet; and
the preceding painting robot and the subsequent painting robot are configured to release the connection between the arm leading end portion and the holder against the magnetic force of the permanent magnet, in accordance with an instruction from the controller.

7. The painting facility according to claim 1, wherein:
under the state of the respective arm leading end portion of the preceding painting robot and the subsequent painting robot being connected to the holder;
the controller is configured to execute a predetermined safety operation based on the detection of an abnormality occurrence in the connection between the arm leading end portion and the holder or application of an abnormal external force to the holder connected to the arm leading end portion.

8. The painting facility according to claim 7, wherein the arm leading end portion of the preceding painting robot and the arm leading end portion of the subsequent painting robot each includes:
an air passage which opens in a connection joint face between the respective arm leading end portion and the holder, wherein the air passage is closed upon establishment of the connection between the respective arm leading end portion and the holder; and
a pressure detector for detecting the pneumatic pressure in the air passage;
wherein the abnormality occurrence is detected based on a pressure detected by the pressure detector when a positive or negative pneumatic pressure is applied in a closed state of the air passage.

9. The painting facility according to claim 1, wherein:
the holder includes a plurality of suckers to be sucked to the painting object for connecting the painting object to the holder; and
wherein the plurality of suckers are disposed in correspondence with a plurality of connection target portions in the painting object.

10. The painting facility according to claim 1, wherein:
the holder includes a sucker to be sucked to the painting object for connecting the painting object to the holder; and
in a suction passage for drawing inside air of the sucker to suck the sucker to the painting object, there is incorporated a check valve or an opening/closing valve for blocking air flow toward the inside of the sucker.

11. The painting facility according to claim 10, wherein:
the suction passage is formed inside the holder; and
a suction opening of the suction passage opens in the connection joint face between the respective arm leading end portion of the preceding painting robot and the subsequent painting robot and the holder.

12. The painting facility according to claim 1, wherein:
the holder includes: a sucker to be sucked to the painting object for connecting the painting object to the holder; and a cover for covering the sucker; and
the cover is configured such that when the sucker is under an un-sucked extended state, a leading end sucking portion of the sucker protrudes from a covering area of the cover, whereas when the sucker is under a sucked contracted state, the leading end sucking portion of the sucker is retracted to the inner side of the covering area of the cover.

13. The painting facility according to claim 1, wherein:
the holder includes a sucker for connecting the respective arm leading end portion of the preceding painting robot and the subsequent painting robot to the holder, the sucker configured to generate an air suction force to maintain the connection between the respective arm leading end portion of the preceding painting robot and the subsequent painting robot and the holder;
the sucker is configured to be sucked to the painting object by suction of inside air thereof with air suction.

14. The painting facility according to claim 1, wherein:
the preceding sprayer is disposed under a downward orientation at an upper portion of the preceding spraying area, whereas the subsequent sprayer is disposed under a downward orientation at an upper portion of the subsequent spraying area;
a preceding robot installing area for installing the preceding painting robot and a subsequent robot installing area for installing the subsequent painting robot are disposed side by side along a painting area juxtaposing direction along which the preceding painting area and the subsequent painting area are juxtaposed and disposed adjacent a lateral side of the respective corresponding painting area; and
the transfer section is disposed between the preceding painting robot and the subsequent painting robot in a border portion between the preceding robot installing area and the subsequent robot installing area.

15. The painting facility according to claim 14, wherein:
the preceding painting area and the subsequent painting area are partitioned from each other by an air curtain or a partition wall in the painting area juxtaposing direction; and
the preceding robot installing area and the subsequent robot installing area are opened to each other in the painting area juxtaposing direction or partitioned from each other in the painting area juxtaposing direction by an air curtain.

* * * * *